June 17, 1924.  
E. HALL  
1,497,683  
SUPPORTING DEVICE FOR TREES AND THE LIKE  
Filed Feb. 14, 1923
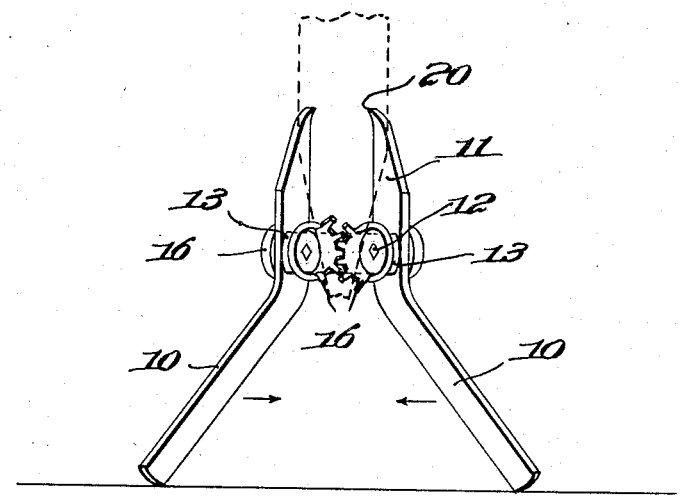
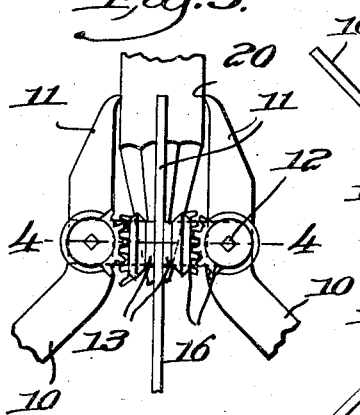
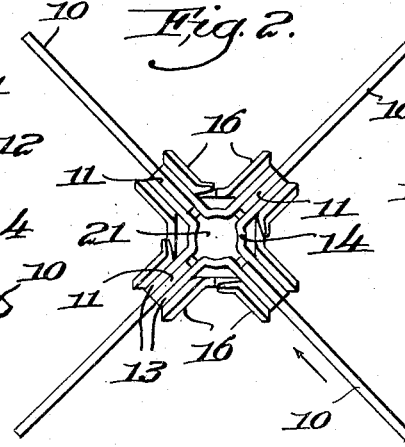
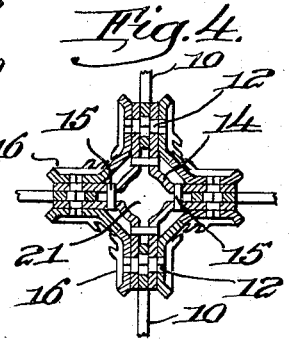
Inventor:  
Edgar Hall,  
by Edward F. Allen  
his Atty.

Patented June 17, 1924.

1,497,683

UNITED STATES PATENT OFFICE.

EDGAR HALL, OF CAMBRIDGE, MASSACHUSETTS.

SUPPORTING DEVICE FOR TREES AND THE LIKE.

Application filed February 14, 1923. Serial No. 619,023.

*To all whom it may concern:*

Be it known that I, EDGAR HALL, a citizen of the United States of America, and a resident of Cambridge, in the county of Middlesex and Commonwealth of Massachusetts, have invented certain new and useful Improvements in Supporting Devices for Trees and the like, of which the following is a specification.

This invention relates to supporting devices for trees and the like, and more particularly to a support or stand adapted for use in holding or supporting Christmas trees when used indoors for decorative purposes. An object of the invention is to produce a stand of this class, that is simple, efficient, and the manufacturing cost of which is low.

It is a further object of the invention to produce a stand that automatically adjusts itself to trees of various diameters, and wherein the weight of the tree automatically causes a plurality of props to firmly grip the trunk thereof, whereby it is rigidly held in upright position.

Another object of the invention is to produce a stand, the ground contact portions of which, are each controlled by the others, in such manner as to insure the contact of all said portions when said stand rests upon the ground.

It is also an object of the invention to so arrange the props, that in their automatic gripping action they first center the tree trunk relatively to the stand as a whole, and thereafter grip it and sustain it in its centered position.

The invention further consists in certain features of construction and arrangement of parts which will be fully understood from a description of the drawings and the claims hereinafter given.

Of the drawings:

Figure 1 represents an elevation of the stand as it would appear when in use.

Figure 2 a top plan view of Figure 1.

Figure 3 a partial elevation of the stand looking in the direction of the arrow Figure 2.

Figure 4 a section on the line 4—4 Figure 3.

Like characters represent like parts throughout the several figures of the drawings.

Referring to the drawings:

As it is an object of this invention to produce a tree holder at low cost, the drawings herewith illustrate one form wherein the parts are preferably made of pressed metal, but it will be understood that it is not the intention to limit the invention to the precise construction and arrangement shown as it is obvious that slight changes might be made therein without departing from the spirit and scope of the invention.

In the present instance the legs 10, the upper portions of which are angularly arranged with respect to said legs to form props 11, are pivotally mounted as at 12 in the radially extending portions 13 of tie members 14, which are assembled as seen in Figure 4 and permanently held in position by means of rivets 15.

The said pivots 12 being rigidly secured to the said legs are adapted to rotate in their bearings formed in the portions 13, and have squared ends to receive the mutilated gears 16 to which they are permanently secured by upsetting the said ends.

Each of the pivots has a gear at each of its ends adapted to mesh with an adjacent gear in such manner that pivotal movement of one of the legs will be transmitted to all the legs simultaneously and consequently upon movement of the legs, the props 11 will be moved toward or away from a common center depending upon the direction of movement of the legs.

From the foregoing it will be seen that the stand is composed of four like parts or tie members 14 riveted together to form a frame in which to pivotally mount the legs 10, which as will be observed are alike in every particular, eight gears, each of which is or may be a duplicate of its neighbor, and four pivot pins preferably forming part of or firmly secured to the legs 10.

While there are twenty four parts to the stand as shown, it will also be observed that nineteen of the parts are merely reproductions of five of the parts viz: legs, pivot, gear, rivet, and tie member. Preferably the props 11 will be provided with spurs 20 to grip the tree trunk, and the tie members will be so shaped that when assembled, an opening 21 will be formed thereby to receive the previously pointed end of the said trunk.

To mount a tree in the holder the trunk at the base thereof will first be somewhat sharpened or pointed as indicated in Figures 1 and 3, and the legs 10 swung inwardly toward a common center, see arrows Figure 1, until the props 11 are sufficiently separated to allow the said pointed trunk end to be entered in the opening 21, whereupon the stand will be placed upon its legs.

The weight of the tree plus a pull on one of the legs will cause all the legs to move radially outward until the spurs contact with and grip the tree trunk by which it will be held in upright position.

It is obvious that the arrangement of the props is such that upon the closing in movement thereof the prop or props first contacting with the trunk will cause it to be moved to a central position where all the props will contact and the weight of the tree will cause the spurs to sink into the trunk and thus firmly hold it in an upright central position.

Various tree holders have been used, but it is not known that one has been used wherein the legs and props were integral, and moved simultaneously when being adjusted, or wherein the legs all moved simultaneously to thereby maintain the ground contacts thereof in a common plane, or wherein the weight of the tree added its quota to stabilize it with respect to the holder, and wherein the tree is first centered and thereafter held in an upright centered position.

Having described the invention I claim:

1. In a tree holder of the class described, a plurality of radially arranged supporting legs, said means including toothed segments having props integral therewith and angularly arranged thereto; a frame in which said legs are pivotally mounted; pivots for said legs; and means whereby pivotal movement of one leg will transmit like movement to all the legs.

2. In a tree holder of the class described, a plurality of legs having props integral therewith and adapted to be pivotally mounted; a frame in which said legs are pivotally mounted, said frame consisting of a plurality of like parts secured together; and means whereby pivotal movement of one of said legs will be transmitted to all the legs, said means including toothed segments fast with each leg and oppositely disposed with respect thereto and each in mesh with a segment of an adjacent leg.

3. In a tree holder of the class described, a plurality of supporting legs having props integral therewith and angularly arranged thereto and adapted to be pivotally mounted in a frame; a frame in which said legs are pivotally mounted consisting of a plurality of like parts rigidly secured together; pivots for said legs and fast thereto; and gears fast to said pivots and arranged in pairs for each leg and each adapted to mesh with a gear of an adjacent leg whereby pivotal movement of one of the legs is transmitted to all the legs simultaneously.

4. In a tree holder of the class described, a frame adapted to receive the reduced end of a tree trunk; a plurality of radially arranged legs pivotally mounted in said frame, each leg having a prop upwardly extending therefrom and having a toothed segment at each side thereof movable in unison therewith and each segment of a leg meshing with a like segment of an adjacent leg whereby said props will be simultaneously moved toward a common center when said tree trunk is presented to said frame.

Signed by me at Boston, Massachusetts, this 13th day of February, 1923.

EDGAR HALL.